United States Patent
Shih et al.

(10) Patent No.: US 12,430,722 B2
(45) Date of Patent: Sep. 30, 2025

(54) IMAGE PROCESSING METHOD AND IMAGE PROCESSING DEVICE

(71) Applicant: MEDIATEK INC., Hsinchu (TW)

(72) Inventors: Cheng-Yu Shih, Hsinchu (TW); Hao-Tien Chiang, Hsinchu (TW); Yuan-Chen Cheng, Hsinchu (TW); Ying-Wei Wu, Hsinchu (TW); Tai-Hsiang Huang, Hsinchu (TW); Ying-Jui Chen, Hsinchu (TW); Chi-Cheng Ju, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 338 days.

(21) Appl. No.: 18/325,038

(22) Filed: May 29, 2023

(65) Prior Publication Data
US 2024/0404019 A1    Dec. 5, 2024

(51) Int. Cl.
    G06T 5/00      (2024.01)
    G06T 5/50      (2006.01)
    G06T 5/70      (2024.01)

(52) U.S. Cl.
    CPC .............. *G06T 5/70* (2024.01); *G06T 5/50* (2013.01); *G06T 2207/20224* (2013.01)

(58) Field of Classification Search
CPC .... G06T 5/70; G06T 5/50; G06T 2207/20224
See application file for complete search history.

(56) References Cited

FOREIGN PATENT DOCUMENTS

WO    WO-2021073519 A1 *  4/2021  ............... G06T 1/20

* cited by examiner

*Primary Examiner* — Mekonen T Bekele
(74) *Attorney, Agent, or Firm* — McClure, Qualey & Rodack, LLP

(57) ABSTRACT

An image processing method is provided. The method includes the step of comparing each of the input pixels in an input image to a corresponding buffered pixel in a buffered image, and computing the difference value between the input pixel value of the input pixel and the buffered pixel value of the buffered pixel. The method further includes the step of generating a blended image based on the input pixel values and the corresponding difference values. The method further includes the step of determining whether a criterion associated with the difference value is met, for each of the difference values. The method further includes the step of updating, for each of the buffered pixels in the buffered image, the buffered pixel value based on the corresponding input pixel value if the criterion is met, and keeping the buffered pixel value unchanged if the criterion is not met.

10 Claims, 3 Drawing Sheets

IMAGE PROCESSING METHOD AND IMAGE PROCESSING DEVICE

BACKGROUND OF THE INVENTION

Field of the Invention

The present disclosure relates generally to image processing, and it relates in particular to an image processing method and an image processing device for noise reduction.

Description of the Related Art

During the process of recording video or real-time previewing using a camera, it is common for noise to be produced by the camera's sensor or image signal processor (ISP). The noises are undesirable because they lead to flickering throughout each frame of the video. Moreover, when a moving object passes by, sudden noise may appear, causing discontinuity in comparison to other regions of the video.

A common solution to address this issue is to use a noise reduction technique, which blends the current input frame with its previous frame. However, when a noisy frame (i.e., a frame with noise) is encountered, blending it with the following frame can propagate the noise to subsequent frames. To avoid this, the next frame after a noisy frame is not blended with the noisy frame. The limitation of this technique is that if a sequence of noisy frames occurs, the number of previous frames that can affect the current frame will reset to zero, and the accumulation process will start over once the noisy frames are no longer present. Therefore, the capability of the noise reduction technique may not be sustained.

Therefore, there is a need for an image processing method and an image processing system to improve the quality of recorded videos and provide a more visually pleasing experience for the viewer.

BRIEF SUMMARY OF THE INVENTION

An embodiment of the present disclosure provides an image processing method. The image processing method includes the step of comparing each of the input pixels in an input image to a corresponding buffered pixel in a buffered image, and computing the difference value between the input pixel value of the input pixel and the buffered pixel value of the buffered pixel. The input pixel and the buffered pixel correspond in position to each other in the input image and the buffered image. The image processing method further includes the step of generating a blended image based on the input pixel values and the corresponding difference values. The image processing method further includes the step of determining whether a criterion associated with the difference value is met, for each of the difference values. The image processing method further includes the step of updating, for each of the buffered pixels in the buffered image, the buffered pixel value based on the corresponding input pixel value in response to the criterion being met, and keeping the buffered pixel value unchanged if the criterion is not met.

In an embodiment, the step of determining whether the criterion associated with the difference value is met, includes determining if the difference value is below a threshold value. The criterion is met if the difference value is below the threshold value.

In an embodiment, the step of updating the buffered pixel value based on the corresponding input pixel value includes computing the weighted average of the buffered pixel value and the input pixel value, and overwriting the buffered pixel value with the calculated weighted average.

In an embodiment, the step of generating the blended image based on the input pixel values and the corresponding difference values, includes computing, for each of a plurality of blended pixels in the blended image, a blended pixel value of the blended pixel based on the input pixel value and the difference value. The blended pixel and the input pixel correspond in position to each other in the blended image and the input image.

In an embodiment, the step of determining whether the criterion associated with the difference value is met, includes computing an input noise value for each of the input pixels, computing a blended noise value for each of the blended pixels, and determining whether the criterion is met based on the blended noise value and the input noise value.

In addition, an embodiment of the present disclosure provides an image processing system. The image processing system includes a pixel-wise comparing module, a pixel-wise blending module, and a pixel-wise updating module. The pixel-wise comparing module is configured to compare each of a plurality of input pixels in an input image to a corresponding buffered pixel in a buffered image, and to compute the difference value between the input pixel value of the input pixel and the buffered pixel value of the buffered pixel. The input pixel and the buffered pixel correspond in position to each other in the input image and the buffered image. The pixel-wise blending module is configured to generate a blended image based on the input pixel values and the corresponding difference values. The pixel-wise updating module is configured to determine whether a criterion associated with the difference value is met, for each of the difference values. The pixel-wise updating module is further configured to update, for each of the buffered pixels in the buffered image, the buffered pixel value based on the corresponding input pixel value in response to the criterion being met, and to keep the buffered pixel value unchanged in response to the criterion not being met.

In an embodiment, the pixel-wise updating module is further configured to determine if the difference value is below a threshold value. The criterion is met if the difference value is below the threshold value.

In an embodiment, the pixel-wise updating module updates the buffered pixel value by computing the weighted average of the buffered pixel value and the input pixel value, and overwriting the buffered pixel value with the calculated weighted average.

In an embodiment, the pixel-wise blending module is further configured to compute, for each of a plurality of blended pixels in the blended image, a blended pixel value of the blended pixel based on the input pixel value and the difference value. The blended pixel and the input pixel correspond in position to each other in the blended image and the input image.

In an embodiment, the pixel-wise updating module is further configured to compute an input noise value for each of the input pixels, to compute a blended noise value for each of the blended pixels, and to determine whether the criterion is met based on the blended noise value and the input noise value.

The image processing method provided in the present disclosure is proven to be capable of reducing noise more effectively and consistently across different phases, and thus is a superior solution for noise reduction in image processing applications.

BRIEF DESCRIPTION OF THE DRAWINGS

The present disclosure can be more fully understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

Ordinal terms used in the claims, such as "first," "second," "third," etc., are only for convenience of explanation, and do not imply any precedence relation between one another.

The description for the embodiments the image processing method is also applicable to the embodiments of the image processing device, and vice versa.

Figure 1:
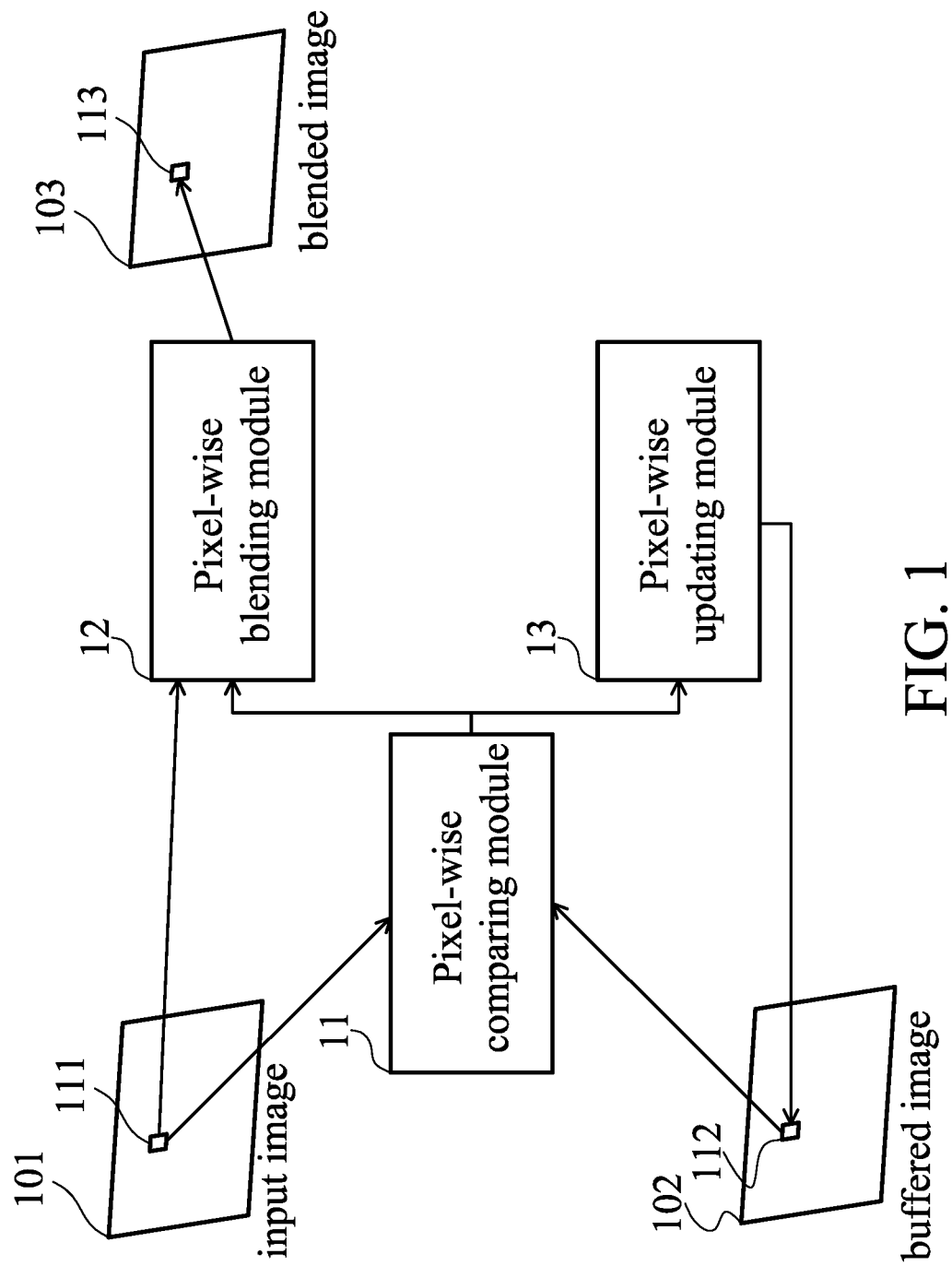
FIG. 1 is a schematic diagram illustrating the image processing device, according to an embodiment of the present disclosure.

FIG. 1 is a schematic diagram illustrating the image processing device 10, according to an embodiment of the present disclosure. As shown in FIG. 1, the image processing device 10 includes the pixel-wise comparing module 11, the pixel-wise blending module 12, and the pixel-wise updating module 13.

The image processing device 10 may be implemented using either general-purpose processing units or special-purpose hardware circuitry. In an embodiment, the image processing device 10 can be a general-purpose processor, a microprocessor, or a microcontroller that loads a program or an instruction set from the electronic device's storage unit (which may include both volatile and non-volatile memories) to carry out the functions of the pixel-wise comparing module 11, the pixel-wise blending module 12, and the pixel-wise updating module 13. In another embodiment, the image processing device 20 may include one or more integrated circuits, such as application-specific integrated circuits (ASICs) and/or field programmable gate arrays (FPGAs), that are dedicated to implementing the pixel-wise comparing module 11, the pixel-wise blending module 12, and the pixel-wise updating module 13.

In an embodiment, the image processing device 10 can be utilized as an essential component in electronic devices, such as cameras and mobile devices that possess photography and imaging capabilities. These electronic devices may consist of an image sensor (though not shown in FIG. 1) in addition to the image processing device 10. The image sensor converts the optical signals received from a variety of lenses into electrical signals, which are then forwarded to the image processing device 10 for further processing. The input image 101 in FIG. 1 is acquired by the image sensor in the form of the electrical signals, and is sent to the image processing device 10 as one of a sequence of video frames. The input image 101 is composed of a plurality of pixels, and it serves as the initial input for the image processing device 10. For ease of reference, these pixels are referred to as "input pixels." The image processing device 10 processes the input image 101 by performing the pixel-wise comparing module 11, the pixel-wise blending module 12, and the pixel-wise updating module 13 to reduce noise and enhance the overall quality of the image. The term "pixel-wise" in these modules refers to the image processing device 10 processing images on a per-pixel basis, which will be further explained in detail later on. Additionally, it is worth noting that the input image 101 may represent the entire current input frame, or only a specific portion of the current input frame.

In contrast to the prior art method of blending the input image 101 with its previous video frame, embodiments of the present disclosure utilize a pixel-wise blending technique that blends the input image 101 with a buffered image 102. The buffered image 102 is the cumulative result of previous input images blended with previous buffered images. Like the input image 101, the buffered image 102 is composed of a plurality of pixels, which will be referred to as "buffered pixels." The pixel-wise blending technique will be explained in greater detail later.

The pixel-wise comparing module 11 is configured to compare each input pixel (in this case, input pixel 111 as shown in FIG. 1) in the input image 101 to the corresponding buffered pixel 112 in the buffered image 102, and to compute the difference value between the input pixel value of the input pixel 111 and the buffered pixel value of the buffered pixel 112. Once computed, the difference value is transmitted to both the pixel-wise blending module 12 and the pixel-wise updating module 13. It is worth noting that the input pixel 111 and the buffered pixel 112 correspond in position to each other in the input image 101 and the buffered image 102.

In an embodiment, the input pixel value and buffered pixel value can be represented in various color spaces, including but not limited to the HSV, YCbCr, YUV, ICtCp, or RGB domains. For instance, in the RGB color space, each pixel value is composed of three components representing the intensities of red (R), green (G), and blue (B). The difference value between the input pixel value and the buffered pixel value can be computed using different distance metrics, such as the Manhattan distance, Euclidean distance, Minkowski distance, or any other relevant metric for measuring the similarity or dissimilarity between pixel values. The choice of color space and distance metric may depend on the specific application and the nature of the input data. For instance, the HSV color space may be more appropriate for processing images with varying lighting conditions, while the YCbCr color space may be more suitable for image compression applications. Similarly, the Euclidean distance metric may be preferred for capturing color differences that are perceptually meaningful to the human eye, while other metrics may be more suitable for specific tasks, such as object recognition or image retrieval. While the selection of color space and distance metric are not limited by the present disclosure, they can impact the accuracy and efficiency of the pixel-wise comparing module and should be carefully considered.

The pixel-wise blending module 12 is configured to generate the blended image 103 based on the input pixel values and the corresponding difference values.

In an embodiment, the pixel-wise blending module 12 is further configured to compute, for each blended pixel (in this case, blended pixel 113 as shown in FIG. 1) in the blended image 103, a blended pixel value of the blended pixel 113 based on the input pixel value and the difference value. It is worth noting that the blended pixel 113 and the input pixel 111 correspond in position to each other in the blended image 103 and the input image 101.

The difference value, which indicates the dissimilarity between the input pixel value and the buffered pixel value, plays a crucial role in determining the degree of blending. It is worth noting that the impact of the difference value on the blend is not always straightforward, and a more sophisticated approach may be needed. For example, a certain function or mapping table can be utilized to establish the relationship between the input pixel value, the difference value, and the blending intensity, thereby achieving more accurate and adaptive blending. While the specific choice of the function or mapping table is not limited by the present disclosure, it is recommended to ensure that it is carefully designed to balance the tradeoff between accuracy and computational efficiency.

The pixel-wise updating module 13 is configured to determine whether a criterion associated with the difference value is met, for each of the difference values.

In an embodiment, the pixel-wise updating module 13 is further configured to determine if the difference value is below a threshold value. The criterion is met if the difference value is below the threshold value. The threshold value may be determined based on various factors, such as the features of the input image 101, including brightness, contrast, and noise level. Alternatively, the threshold value can be set manually based on user preferences or application requirements.

In an embodiment, the pixel-wise updating module 13 updates the buffered pixel value by computing the weighted average of the buffered pixel value and the input pixel value, and overwriting the buffered pixel value with the calculated weighted average. Specifically, the pixel-wise updating module 13 computes the weighted average of the buffered pixel value and the input pixel value, with the weight assigned to the buffered pixel value being inversely proportional to the difference value. This means that if the difference value is large, the weight assigned to the buffered pixel value will be low, and vice versa. The weight assignment can further take into account other features of the input image 101, such as brightness, contrast, and noise levels, but the present disclosure is not limited thereto.

In another embodiment, the pixel-wise updating module 13 is further configured to compute an input noise value for each of the input pixels, to compute a blended noise value for each of the blended pixels, and to determine whether the criterion is met based on the blended noise value and the input noise value. The input noise value represents the noise level of the original input pixel, while the blended noise value represents the noise level of the pixel after blending. The pixel-wise updating module 13 then compares these values to determine if the criterion is met. For example, if the blended noise value is statistically significantly lower than the input noise value, indicating that the pixel-wise blending module 12 has significantly reduced the noise level of the input pixel based on the difference value computed by the pixel-wise comparing module 11, so it is determined that the criterion is met. Various approaches can be used to measure the noise score, including mean squared error (MSE), peak signal-to-noise ratio (PSNR), or structural similarity index (SSIM), among others, but the present disclosure is not limited thereto.

Figure 2:
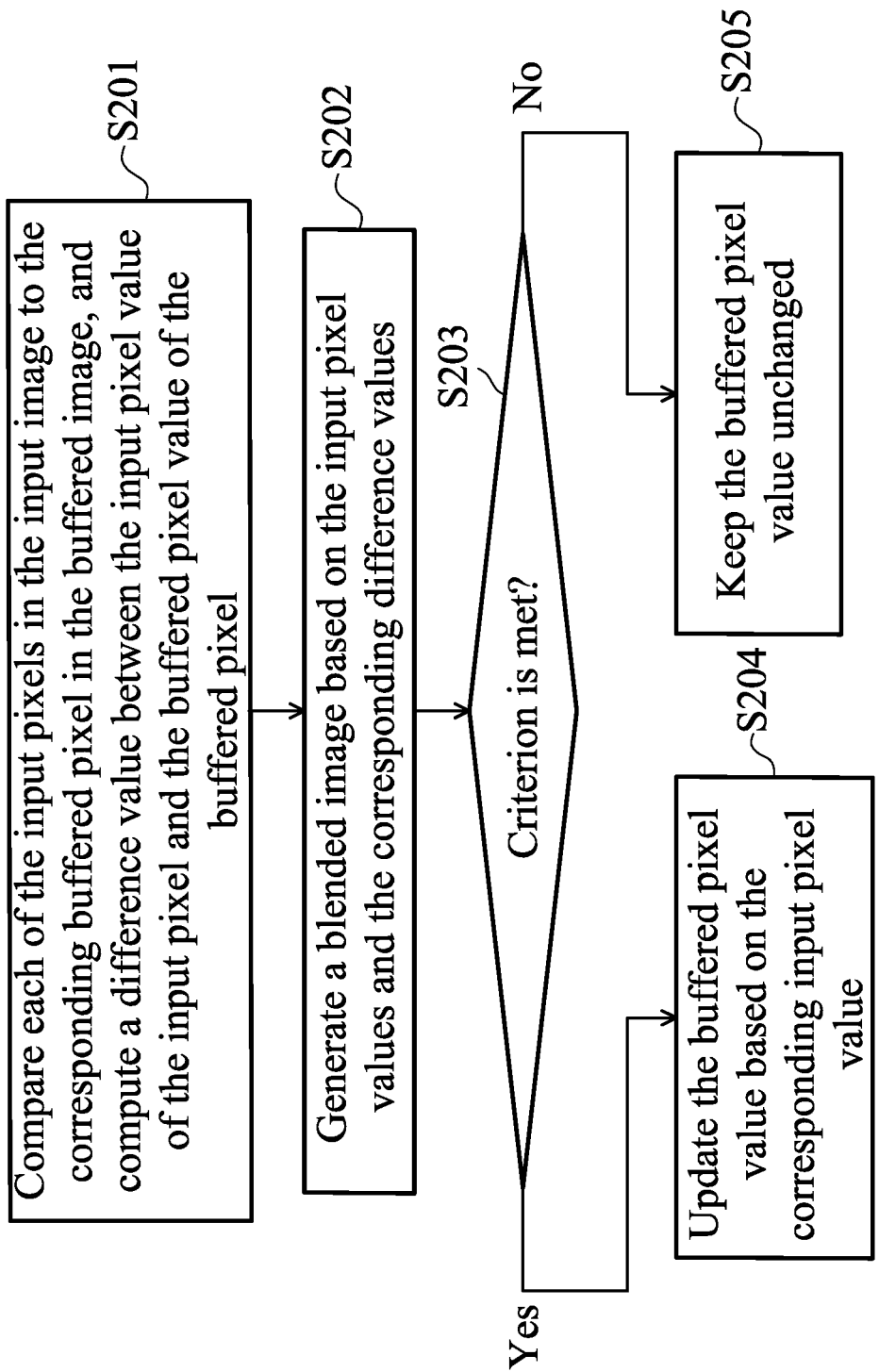
FIG. 2 is the flow diagram of the image processing method executed by the image processing device, according to an embodiment of the present disclosure.

FIG. 2 is the flow diagram of the image processing method 200 executed by the image processing device 10, according to an embodiment of the present disclosure. As shown in FIG. 2, the image processing method 200 includes steps S201-S205. Step S201 is performed by the pixel-wise comparing module 11, step S202 is performed by the pixel-wise blending module 12, and steps S203 is performed by the pixel-wise updating module 13.

In step S201, each of the input pixels (in this case, input pixel 111 as shown in FIG. 1) in the input image 101 is compared to the corresponding buffered pixel 112 in the buffered image 102, and the difference value between the input pixel value of the input pixel 111 and the buffered pixel value of the buffered pixel 112 is computed.

In step S202, the blended image 103 is generated based on the input pixel values and the corresponding difference values.

In step S203, it is determined, for each of the difference values, whether a criterion associated with the difference value is met. If the criterion is met, the image processing method 200 proceeds to S204. If the criterion is not met, the image processing method 200 proceeds to S205.

In step S204, the buffered pixel value is updated based on the corresponding input pixel value.

In step S205, the buffered pixel value remains unchanged.

It is worth noting that the pixel-wise blending module 12 and the pixel-wise updating module 13 can be designed to function independently from each other. Therefore, the order of execution for the steps S202 and S203, as depicted in the flow diagram of FIG. 2, is not strictly fixed. This means that step S202 may be executed before, after, or even concurrently with S203, depending on the implementation and requirements of the particular application.

In an embodiment, step S203 further includes determining if the difference value is below a threshold value. The criterion is met if the difference value is below the threshold value.

In an embodiment, step S204 further includes computing the weighted average of the buffered pixel value and the input pixel value, and overwriting the buffered pixel value with the calculated weighted average.

In an embodiment, step S202 further includes computing, for each of the blended pixels in the blended image 103, a blended pixel value of the blended pixel, based on the input pixel value and the difference value.

In an embodiment, S203 further includes computing an input noise value for each of the input pixels, computing a blended noise value for each of the blended pixels, and determining whether the criterion is met based on the blended noise value and the input noise value.

Figure 3:
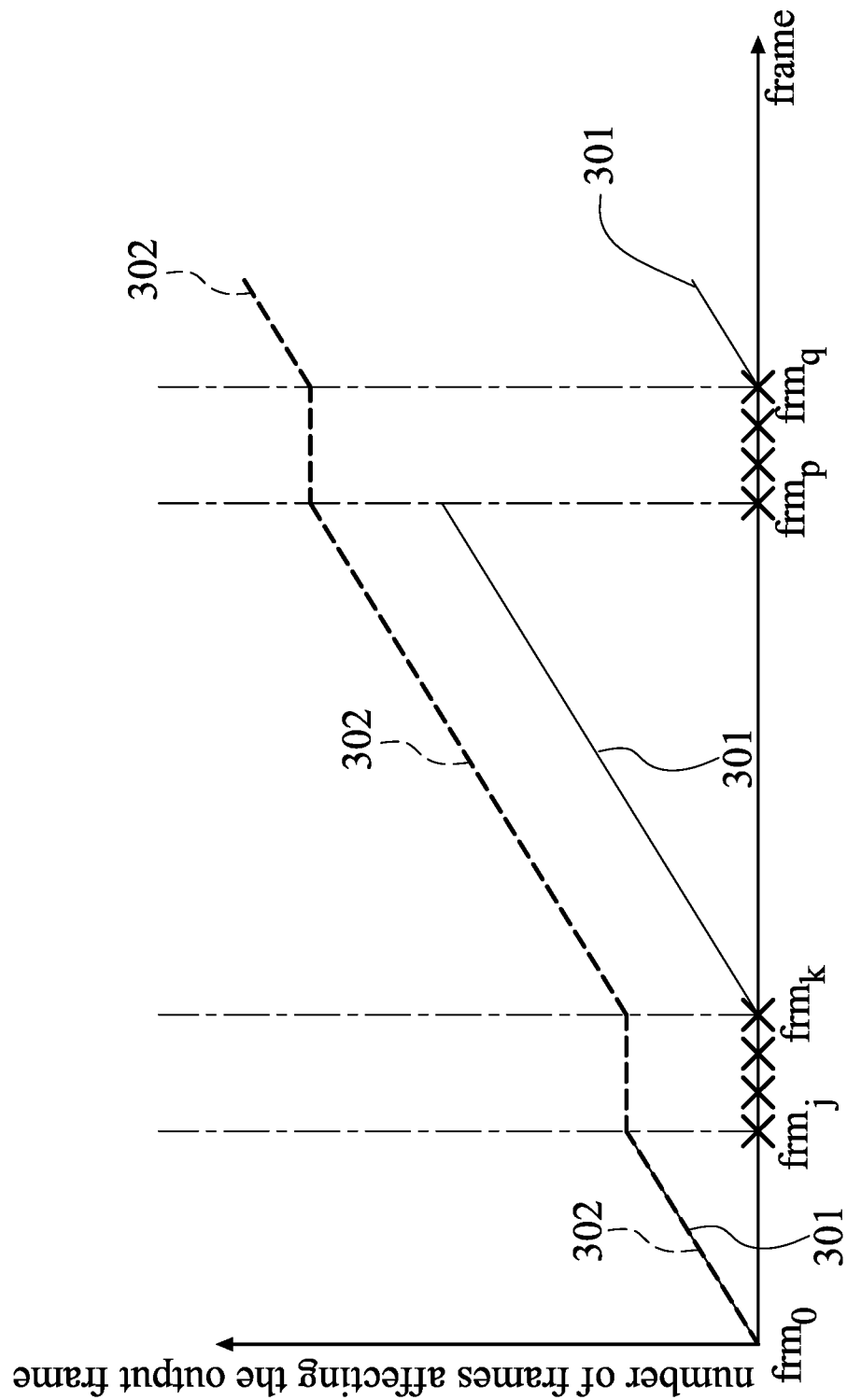
FIG. 3 shows a chart demonstrating the noise reduction capability with respect to a sequence of video frames, according to an embodiment of the present disclosure.

FIG. 3 shows a chart 30 demonstrating the noise reduction capability with respect to a sequence of video frames, according to an embodiment of the present disclosure. The x-axis of the chart 30 represents the sequence (or progress) of video frames, with newer frames positioned to the right. The y-axis of the chart 30 represents the number of previous frames that affect the output frame (i.e., the blended image), which serves as an evaluation dimension reflecting the noise reduction capability. A higher number of frames indicates better capability. The solid line 301 and the dotted line 302 show the change in the number of frames affecting the output frame when using conventional noise reduction techniques and the image processing method 200, respectively. The crosses drawn on the x-axis represents the presence of noisy frames. The changes of the solid line 301 and the dotted line 302 during each phase of frame progress will be described in detail. Additionally, it is worth noting that the chart 30 can be considered at the pixel level or image level.

During the phase from frame $frm_0$ to $frm_j$, there are no noisy frames present. As a result, the solid line 301 and the dotted line 302 overlap substantially, indicating that the number of frames affecting the output frame accumulates as the frames progress from $frm_0$ to $frm_j$ for both conventional noise reduction technique and the image processing method 200. This is because the buffered image used by image processing method 200 to blend with the current frame is almost identical to "the previous frame of the current frame" used by the conventional technique. Furthermore, as the buffered image for blending is affected by the previous frame, which in turn is affected by its previous frame, and so on, the number of frames affecting the output frame increases as the frames progress from $frm_0$ to $frm_j$.

During the phase from frame $frm_j$ to $frm_k$, there is noise present in the frames. In the case of conventional techniques, to prevent the noise from propagating to subsequent frames, the next frame after a noisy frame is not blended with the noisy frame. Consequently, the number of frames affecting the current frame resets to zero, and remains at zero throughout this phase, as indicated by the solid line 301. However, when using the image processing method 200, the number of frames affecting the output frame is sustained as indicated by the dotted line 302, since the pixel values of the buffered image remain unchanged. This implies that the noise reduction capability is sustained even during the presence of noisy frames when using the image processing method 200.

During the phase from frame $frm_k$ to $frm_p$, there are no noisy frames present. As indicated by the solid line 301, the number of frames affecting the output frame starts from zero and accumulates upwards as the frames progress from $frm_k$ to $frm_p$ when using conventional techniques. In contrast, as indicated by the dotted line 302, the number of frames affecting the output frame accumulates from the level sustained during the previous phase of frame progress when using the image processing method 200. This is because the buffered image used for blending with the current frame retains the noise reduction information from the previous phase. Therefore, the image processing method 200 enjoys better noise reduction capability compared to conventional techniques during this phase.

The phase from frame $frm_p$ to $frm_q$ is similar to the phase from frame $frm_j$ to $frm_k$, in which noisy frames are present, and the number of frames affecting the output frame resets to zero for conventional techniques. On the other hand, the image processing method 200 sustains the number of frames affecting the output frame from the previous phase of frame progress, achieving sustained noise reduction capability.

The phase after $frm_q$ is similar to the phase from frame $frm_k$ to $frm_p$, in which no noisy frames are present. Consequently, the number of frames affecting the output frame starts from zero and accumulates upwards during this phase, as observed in the solid line 301 for conventional techniques. Similarly, the image processing method 200 accumulates the number of frames affecting the output frame from the level sustained during the previous phase of frame progress. Therefore, the noise reduction capability of the image processing method 200 outperforms that of the conventional techniques during this phase, too.

In conclusion, the chart 30 indicates that the image processing method 200 achieves better capabilities in reducing noise compared to conventional techniques throughout the whole frame progress. This is because the image processing method 200 sustains the number of frames affecting the output frame during noisy phases, while the conventional techniques reset to zero. In addition, the number of frames affecting the output frame accumulates from the level sustained during the previous phase when using the image processing method 200. Therefore, the image processing method 200 provided in the present disclosure is proven to be capable of reducing noise more effectively and consistently across different phases, and thus is a superior solution for noise reduction in image processing applications.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method, executed by an image processing device, comprising the following steps:
   comparing each of a plurality of input pixels in an input image to a corresponding buffered pixel in a buffered image, and computing a difference value between an input pixel value of the input pixel and a buffered pixel value of the buffered pixel, wherein the input pixel and the buffered pixel correspond in position to each other in the input image and the buffered image;
   generating a blended image based on the input pixel values and the corresponding difference values;
   determining whether a criterion associated with the difference value is met, for each of the difference values; and
   for each of the buffered pixels in the buffered image, updating the buffered pixel value based on the corresponding input pixel value in response to the criterion being met, and keeping the buffered pixel value unchanged in response to the criterion not being met.

2. The image processing method as claimed in claim 1, wherein the step of determining whether the criterion associated with the difference value is met comprises:
   determining if the difference value is below a threshold value;
   wherein the criterion is met if the difference value is below the threshold value.

3. The image processing method as claimed in claim 2, wherein the step of updating the buffered pixel value based on the corresponding input pixel value comprises:
   computing a weighted average of the buffered pixel value and the input pixel value; and
   overwriting the buffered pixel value with the calculated weighted average.

4. The image processing method as claimed in claim 1, wherein the step of generating the blended image based on the input pixel values and the corresponding difference values comprises:
   for each of a plurality of blended pixels in the blended image, computing a blended pixel value of the blended pixel based on the input pixel value and the difference value, wherein the blended pixel and the input pixel correspond in position to each other in the blended image and the input image.

5. The image processing method as claimed in claim 4, wherein the step of determining whether the criterion associated with the difference value is met comprises:
computing an input noise value for each of the input pixels, and computing a blended noise value for each of the blended pixels; and
determining whether the criterion is met based on the blended noise value and the input noise value.

6. An image processing device, comprising:
a pixel-wise comparing module, configured to compare each of a plurality of input pixels in an input image to a corresponding buffered pixel in a buffered image, and to compute a difference value between an input pixel value of the input pixel and a buffered pixel value of the buffered pixel, wherein the input pixel and the buffered pixel correspond in position to each other in the input image and the buffered image;
a pixel-wise blending module, configured to generate a blended image based on the input pixel values and the corresponding difference values; and
a pixel-wise updating module, configured to determine whether a criterion associated with the difference value is met, for each of the difference values;
wherein the pixel-wise updating module is further configured to update, for each of the buffered pixels in the buffered image, the buffered pixel value based on the corresponding input pixel value in response to the criterion being met, and to keep the buffered pixel value unchanged in response to the criterion not being met.

7. The image processing device as claimed in claim 6, wherein the pixel-wise updating module is further configured to determine if the difference value is below a threshold value; and
wherein the criterion is met if the difference value is below the threshold value.

8. The image processing device as claimed in claim 7, wherein the pixel-wise updating module updates the buffered pixel value by computing a weighted average of the buffered pixel value and the input pixel value, and overwriting the buffered pixel value with the calculated weighted average.

9. The image processing device as claimed in claim 6, wherein the pixel-wise blending module is further configured to compute, for each of a plurality of blended pixels in the blended image, a blended pixel value of the blended pixel based on the input pixel value and the difference value, wherein the blended pixel and the input pixel correspond in position to each other in the blended image and the input image.

10. The image processing device as claimed in claim 9, wherein the pixel-wise updating module is further configured to compute an input noise value for each of the input pixels, to compute a blended noise value for each of the blended pixels, and to determine whether the criterion is met based on the blended noise value and the input noise value.

* * * * *